US008915432B2

(12) United States Patent
Kataoka et al.

(10) Patent No.: US 8,915,432 B2
(45) Date of Patent: Dec. 23, 2014

(54) ELECTRONIC APPARATUS CONTRIBUTING TO GLOBAL ENVIRONMENTAL CONSERVATION

(75) Inventors: Satoru Kataoka, Akiruno (JP); Kenji Igarashi, Tokyo (JP)

(73) Assignees: Casio Computer Co., Ltd., Saitama (JP); Casio Electronics Manufacturing Co., Ltd., Tokyo (JP)

(*) Notice: Subject to any disclaimer, the term of this patent is extended or adjusted under 35 U.S.C. 154(b) by 605 days.

(21) Appl. No.: 12/485,211

(22) Filed: Jun. 16, 2009

(65) Prior Publication Data

US 2009/0314837 A1 Dec. 24, 2009

(30) Foreign Application Priority Data

Jun. 18, 2008 (JP) ................................ 2008-158730

(51) Int. Cl.

*G06F 19/00* (2011.01)
*G03G 15/00* (2006.01)
*G03G 21/18* (2006.01)

(52) U.S. Cl.

CPC .............. *G03G 15/55* (2013.01); *G03G 15/553* (2013.01); *G03G 21/1889* (2013.01); *G03G 15/502* (2013.01); *G03G 2215/00109* (2013.01)
USPC .............................. 235/385; 399/27; 399/381

(58) Field of Classification Search

USPC .................... 235/385; 705/38; 399/12, 27, 81
See application file for complete search history.

(56) References Cited

U.S. PATENT DOCUMENTS 5,127,750 A * 7/1992 Burgin .......................... 400/208
2005/0154669 A1 7/2005 Streetman
2005/0231758 A1* 10/2005 Reynolds ..................... 358/1.15
2007/0092976 A1* 4/2007 Watson et al. ................ 436/181
2007/0108946 A1* 5/2007 Yamauchi et al. ............ 320/132
2007/0297814 A1 12/2007 Kasai
2008/0281732 A1 11/2008 Yamada

FOREIGN PATENT DOCUMENTS

JP 09-288415 A 11/1997
JP 2002-006696 A 1/2002
JP 2003-150695 A 5/2003
JP 2007-329610 A 12/2007
WO WO 2006/090636 A1 8/2006

OTHER PUBLICATIONS

Extended European Search Report dated May 11, 2010 (in English) in counterpart European Application No. 09162959.2.

(Continued)

*Primary Examiner* — Michael G Lee
*Assistant Examiner* — Tabitha Chedekel
(74) *Attorney, Agent, or Firm* — Holtz, Holtz, Goodman & Chick PC

(57) ABSTRACT

The present invention relates to an electronic apparatus concerned about global environment, which enables its user to be convinced of his/her commitment to reducing greenhouse gas emissions accompanying power consumption by letting the user purchase a consumable goods/replacement part to lead the user to join greenhouse gas emissions reduction. The electronic apparatus is configured as a printer, etc. that operates with attached a refill cartridge (consumable goods), which is replaceable in the apparatus body and affixed with information by which a greenhouse gas emission right accordance is identified. The electronic apparatus includes refill cartridge attachment support unit that supports the refill cartridge in the body in attachable/detachable manner, detecting unit that detects the identification information from an attached refill cartridge, evaluating unit that determines identification information accordance and evaluates greenhouse gas reductions by the apparatus based on the identification information, and displaying unit that displays the evaluation of the evaluating unit.

25 Claims, 14 Drawing Sheets

(56) References Cited

OTHER PUBLICATIONS

Kramer, Andrew E.: "Russian Energy Giant to Bundle Carbon Credits with Gas Sales", The New York Times; New York, Apr. 25, 2007. http://www.nytimes.com/2007/04/25/business/worldbusiness/25carbon.html.

Japanese Office Action dated Jun. 22, 2010 and English translation thereof, issued in counterpart Japanese Application No. 2008-158730.

* cited by examiner

FIG. 11

| ECO GOAL SETTING LEVEL | | | STANDARD | LEVEL 1 | LEVEL 2 | LEVEL 3 |
|---|---|---|---|---|---|---|
| POWER SAVING | | PRINTING MODE | 1PJ | 3PJ | 5PJ | 10PJ |
| | | CUMULATIVE POWER CONSUMED (wh) (FOR PRINTING 100 SHEETS) | 200 (SUPPOSED) | 170 (SUPPOSED) | 150 (SUPPOSED) | 100 (SUPPOSED) |
| | | $CO_2$ EMISSION AMOUNT (g/SHEET) | 2×a | 1.7×a | 1.5×a | 1×a |
| | | $CO_2$ REDUCTION AMOUNT (g) | 0.00 | 0.3×a | 0.5×a | a |
| | "a"g-$CO_2$/wh | REDUCTION RATE (%) | 0 (STANDARD) | 15 | 25 | 50 |
| PAPER SAVING | | PRINTING MODE | 1 SHEET/ONE SIDE ONLY (=1 PAGE) | 1 SHEET/BOTH SIDES (=2 PAGES) | 1 SHEET/ONE SIDE ONLY BY MULTI (=2 PAGES) | 1 SEHET/BOTH SIDES BY MULTI (=4 PAGES) |
| | | $CO_2$ EMISSION AMOUNT (g) | b | b | b | b |
| | | $CO_2$ REDUCTION AMOUNT (g) | 0.00 | b | b | b×3 |
| | "b"g-$CO_2$/SHEET | REDUCTION RATE (%) | 0 (STANDARD) | 50 | 50 | 75 |
| TONER SAVING | | PRINTING MODE (SHEET) | NO TONER SAVING | 15% REDUCTION | 30% REDUCTION | 50% REDUCTION |
| | | $CO_2$ EMISSION AMOUNT (g) | c×d | c×d×0. 85 | c×d×0. 7 | c×d×0. 5 |
| | | $CO_2$ REDUCTION AMOUNT (g) | 0.00 | c×d×0. 15 | c×d×0. 3 | c×d×0. 5 |
| | "c"g-$CO_2$/g | REDUCTION RATE (%) | 0 (STANDARD) | 15 | 30 | 50 |

AMOUNT OF TONER USED: dg/SHEET

FIG. 13

| | ECO GOAL SETTING LEVEL 1 IS SET | ACTUAL ACHIEVEMENT STATUS (%) |
|---|---|---|
| POWER SAVING | 3PJ | 50 |
| PAPER SAVING | 1 SHEET/BOTH SIDES (=2 PAGES) | 50 |
| TONER SAVING | 15% REDUCTION | 60 |
| | ECO ACCOMPLISHMENT DEGREE (%) ※ | 53 |

※ ECO ACCOMPLISHMENT DEGREE=(POWER SAVING ACCOMPLISHMENT DEGREE+PAPER SAVING ACCOMPLISHMENT DEGREE+TONER SAVING ACCOMPLISHMENT DEGREE)/3

FIG. 15A

| | | RELATIVE EVALUATION MODE (INDEPENDENT OF NUMBER OF SHEETS PRINTED) | ABSOLUTE EVALUATION MODE (DEPENDENT ON NUMBER OF SHEETS PRINTED) |
|---|---|---|---|
| ECO DIAGNOSIS | POWER | ACCOMPLISHMENT DEGREE IS 60%. YOU HAVE USED 1PJ MODE MANY TIMES. | YOU HAVE USED MANY SHEETS, AND ALMOST EMITTED MORE CO2 THAN ALLOWED. |
| | PAPER | ACCOMPLISHMENT DEGREE IS 50%. YOU HAVE USED ONE-SIDE PRINTING MANY TIMES. | YOU ARE ABOUT TO MISS THIS MONTH'S GOAL FOR SHEETS CONSUMED. |
| | TONER | ACCOMPLISHMENT DEGREE IS 100%. YOU'VE GOT GOAL. | YOU ARE LIMITED TO USE ONLY ONE MORE K-COLOR TONER CARTRIDGE THIS MONTH. |
| | OTHERS | YOU'VE BEEN LEAVING POWER ON IN NIGHTTIME AND DAYS OFF. PERIOD OF TIME TO ENTER SLEEP CONTROL MODE IS SET SHORT. | YOU'VE BEEN LEAVING POWER ON IN NIGHTTIME AND DAYS OFF. PERIOD OF TIME TO ENTER SLEEP CONTROL MODE IS SET SHORT. |

FIG. 15B

| | | RELATIVE EVALUATION MODE (INDEPENDENT OF NUMBER OF SHEETS PRINTED) | ABSOLUTE EVALUATION MODE (DEPENDENT ON NUMBER OF SHEETS PRINTED) |
|---|---|---|---|
| ECO NAVIGATION FEATURE | POWER | YOU ARE ENCOURAGED TO PRINT AT 2PJ OR HIGHER POWER SAVING SETTING. | TO CLEAR GOAL, YOU ARE ENCOURAGED TO PRINT AT 5PJ MODE POWER SAVING SETTING. |
| | PAPER | YOU ARE ENCOURAGED TO PRINT BY MULTIPRINT/BOTH SIDES OR HIGHER SETTING. | TO CLEAR GOAL, YOU ARE ENCOURAGED TO USE MULTI PRINTING. |
| | TONER | YOU CAN KEEP SAME PACE AS UNTIL NOW. IF YOU USE 50% TONER SAVING. | TO CLEAR GOAL, YOU ARE ENCOURAGED TO PRINT BY 50% TONER SAVING. |
| | OTHERS | REMEMBER TO TURN OFF POWER IN NIGHTTIME AND DAYS OFF. YOU ARE ENCOURAGED TO SET PERIOD OF TIME TO ENTER SLEEP CONTROL MODE SHORTEST. | REMEMBER TO TURN OFF POWER IN NIGHTTIME AND DAYS OFF. YOU ARE ENCOURAGED TO SET PERIOD OF TIME TO ENTER SLEEP CONTROL MODE SHORTEST. |

FIG. 15C

| | | RELATIVE EVALUATION MODE (INDEPENDENT OF NUMBER OF SHEETS PRINTED) | ABSOLUTE EVALUATION MODE (DEPENDENT ON NUMBER OF SHEETS PRINTED) |
|---|---|---|---|
| ECO DIAGNOSIS | INDIVIDUAL A | ACCOPLISHMENT DEGREE IS 60%. PARTICULARLY, ONE-SIDE PRINTING HAS BEEN USED TOO MANY TIMES. | INDIVIDUAL'S GOAL HAS BEEN ACCOMPLISHED TO 100%. |
| | INDIVIDUAL B | ACCOMPLISHMENT DEGREE IS 30%. 1PJ MODE PRINTING HAS BEEN USED MANY TIMES. | INDIVIDUAL'S GOAL HAS BEEN ACCOMPLISHED TO 50%. |
| | GROUP C | ACCOMPLISHMENT DEGREE IS 100%. GROUP HAS ACCOMPLISHED GOAL. | GROUP'S GOAL HAS BEEN ACCOMPLISHED TO 50%. RELATIVE EVALUATION MODE IS CLEARED, BUT MANY SHEETS HAVE BEEN CONSUMED. |
| | ⋮ | ⋮ | ⋮ |

ELECTRONIC APPARATUS CONTRIBUTING TO GLOBAL ENVIRONMENTAL CONSERVATION

BACKGROUND OF THE INVENTION

1. Field of the Invention

The present invention relates to an electronic apparatus, in which a refill cartridge (consumable goods) or a replacement part that is accorded a right to emit greenhouse gas (GHG) is used for global environmental concerns.

2. Description of the Related Art

Today, global environmental conservation is demanded worldwide, and the global warming conference takes initiative in putting into force the emissions control on greenhouse gas such as carbon dioxide ($CO_2$). Under this circumstance, efforts are made to deal with reductions of $CO_2$ from general electronic apparatuses including printers, and pertinent patent applications are filed.

For example, Unexamined Japanese Patent Application KOKAI Publication No. 2007-249563 is an example invention of an information processing apparatus including a printer, which allows setting of a target value of its consumption of a resource such as sheets of paper, forecasts a future amount of its resource consumption based on the current status of its resource consumption, stops consuming the resource if it is impossible to attain the target and issues a report for the target to be accomplished.

Unexamined Japanese Patent Application KOKAI Publication No. 2002-006696 is an example invention that translates an amount of power consumed during a certain period of time of use of an image forming apparatus and an amount of a refill cartridge consumed by the image forming apparatus during the same period of time into $CO_2$, encourages a recommendable mode for reducing $CO_2$ emissions, and forecasts improvement in $CO_2$ emissions.

However, the examples described above, each of which either outputs a report for reduction of resource consumption or forecasts improvement in $CO_2$ emissions, can merely guide the user of the apparatus toward accomplishing the goal of tightening resource consumption by notifying the power consumption status, etc. to the user, or can merely notify a carbon dioxide emissions status corresponding to the use of the apparatus to the user to remind the user of a mode of use of the apparatus that will lead to reductions of emissions. That is, these examples do not propose an electronic apparatus according to the present invention, which can use a refill cartridge or a replacement part that is sold with a right to emit greenhouse gas attached (by the manufacturer), recognizes that a cartridge or a replacement part with such an emission right is mounted thereon, and displays the degree of its eco (ecology (global environmental protection)) accomplishment and guidance or navigation about greenhouse gas.

SUMMARY OF THE INVENTION

The present invention provides a system for a manufacturer or a distributor of an electronic apparatus that emits greenhouse gas to share the expenses spent in contributing to carbon offset activities (including expenses for purchasing offset credits) with a user who purchases and uses the electronic apparatus, so that not only the manufacturer/distributor but the purchaser/user of the electronic apparatus may automatically participate in carbon offset activities and make cooperation and contribution to the global environmental protection.

Here, carbon offsetting is a global environmental protection activity that aims for bringing carbon dioxide ($CO_2$) generation substantially to zero by offsetting $CO_2$ that is unavoidably generated from living and business activities by carrying out activities such as tree plantation, forest protection, clean energy projects, etc. that aim for $CO_2$ reduction or absorption To be more specific, the system of the present invention seeks an activity of a manufacturer/distributor of an electronic apparatus for contributing part of proceeds from sales of refills or replacement parts to global environmental protection projects (including purchase of offset credits) and offsetting greenhouse gas emissions that amount to the power consumed by the electronic apparatus.

That is, in this activity, for realizing substantially zero GHG emissions, GHG emissions amounting to the power consumed by the electronic apparatus are offset by acquisition of emission rights (Certified Emission Reductions (CERs)) that derive from greenhouse gas reduction projects (based on Clean Development Mechanism (CDM)) carried out all across the world.

Here, the expenses spent on the acquisition are partially reflected in the sales price of refills and replacement parts of the electronic apparatus, these refills and replacement parts (which reflect such expenses) are given a sign (tag/mark, etc.) that enables them to be identified as being accorded a right to emit greenhouse gas, and the electronic apparatus is equipped with a capability for recognizing that such a refill or replacement part with the right to emit GHG is used thereon, so that a user who cooperates in the environmental enhancement activity can obtain benefits and thus be encouraged to continuously cooperate in the global environmental protection activity.

The present invention was made in view of the above circumstances, and an object of the present invention is to provide an electronic apparatus that enables its user to be convinced that he/she has committed to reducing greenhouse gas emission that accompanies power consumption by the electronic apparatus by letting the user him/herself select and use a refill or a replacement part with a greenhouse gas emission right, and leads the user to join and contribute to an activity for reducing greenhouse gas emissions.

(Here, a refill or a replacement part with a greenhouse gas emission right is an article that is provided to a user in the form of an "emission right accorded", by a manufacturer or distributor of the refill or the replacement part or a manufacturer or distributor of an electronic apparatus that uses the refill or the replacement part, who has beforehand purchased on behalf of the user a quota of "Certified Emission Reductions (CERs)" for a "greenhouse gas reduction project" that is registered to the international Clean Development Mechanism (CDM) board of directors, with a view to calling for cooperation from a purchaser of the refill/replacement part of the electronic apparatus to let him/her shoulder part of the cost of CERs.)

An electronic apparatus according to a first aspect of the present invention is an electronic apparatus that operates with a replaceable consumable goods attached in a body of the electronic apparatus, and includes: a consumable goods attachment supporting unit that supports the consumable goods to the body in an attachable and detachable manner; a detecting unit that detects identification information (sign) that indicates that a right to emit GHG is accorded to the consumable goods, from the consumable goods, which is attached in the body, an evaluating unit that evaluates a degree of contribution by the electronic apparatus to an activity for reducing the GHG, in response to detection of the identification information; and a displaying unit that displays an evaluation result obtained by the evaluating unit.

The electronic apparatus according to a second aspect of the present invention includes a memorizing unit that memorizes a use status of a consumable goods that is accorded an emission right, and the evaluating unit evaluates a frequency of use of the consumable goods that is accorded the emission right.

The electronic apparatus according to a third aspect of the present invention includes a memorizing unit that memorizes a use status of a consumable goods that is accorded an emission right, and the evaluating unit evaluates a continuous use status of the consumable goods that is accorded the emission right.

The evaluating unit used by an electronic apparatus according to a fourth aspect of the present invention obtains an evaluation result by incrementing or decrementing a predetermined point according to a frequency of use or a continuous use status of the consumable goods that is accorded the emission right, and provides a benefit to a user of the electronic apparatus according to a level of the point, which is finally obtained.

The detecting unit used by the electronic apparatus according to a fifth aspect of the present invention is a reading unit that reads identification information stored in RFID that is pasted on the consumable goods, and the identification information is read by the reading unit when the consumable goods is attached in the apparatus body while the RFID is left contactless with the apparatus body.

The detecting unit used by the electronic apparatus according to a sixth aspect of the present invention is a reading unit that reads identification information contained in a barcode that is marked on the consumable goods, and the identification information is read by the reading unit when the consumable goods is attached in the apparatus body while the barcode is left contactless with the apparatus body.

The identification information used by the electronic apparatus according to a seventh aspect of the present invention is stored in a storage unit that is built in the consumable goods, and the identification information is read when the consumable goods is attached in the body, with the storage unit connected to a control unit of the body.

The electronic apparatus according to an eighth aspect of the present invention is the electronic apparatus that can run on a battery, and the consumable goods is a battery that is replaceable in the apparatus body and used as a driving power source of the electronic apparatus.

The electronic apparatus according to a ninth aspect of the present invention is a recording apparatus that requires replenishment of a consumable goods, with which the apparatus performs recording, according to consumption of the consumable goods.

The consumable goods used by the electronic apparatus according to a tenth aspect of the present invention is a toner cartridge filled with toner used for recording performed by the electronic apparatus.

The consumable goods used by the electronic apparatus according to an eleventh aspect of the present invention is an ink ribbon cartridge, in which an ink ribbon used for recording of the electronic apparatus is contained.

The consumable goods used by an electronic apparatus according to a twelfth aspect of the present invention is an ink cartridge filled with ink used for recording of the electronic apparatus.

The electronic apparatus according to a thirteenth aspect of the present invention is a recording apparatus that requires replacement of a consumable goods, with which the apparatus performs recording, according to wastage of the consumable goods.

The consumable goods used by the electronic apparatus according to a fourteenth aspect of the present invention is a drum set, in which a photoconductive drum used for recording performed by the electronic apparatus is contained.

An electronic apparatus according to a fifteenth aspect of the present invention is the electronic apparatus that operates with a replaceable consumable goods attached in a body of the electronic apparatus, and includes: a consumable goods attachment supporting unit that supports the consumable goods to the body in an attachable and detachable manner; a detecting unit that detects identification information (sign) that indicates that a GHG emission right is accorded to the consumable goods, from the consumable goods, which is attached in the body; a global environment enhancing feature that leads to reduction of GHG emissions in global environment; and a goal setting unit that sets a goal for reduction of GHG emissions, and when the identification information is detected by the detecting unit, a use status of the global environment enhancing feature is evaluated by an evaluating unit, and a result obtained by the evaluating unit is displayed by a displaying unit.

The global environment enhancing feature used by the electronic apparatus according to a sixteenth aspect of the present invention is based on a batch printing manner (PJ printing), and the goal setting unit sets a power saving level of the electronic apparatus by designating a degree of the batch printing manner.

The global environment enhancing feature used by the electronic apparatus according to a seventeenth aspect of the present invention is based on a paper saving manner (N-in-1 printing), and the goal setting unit sets a paper consumption saving level of the electronic apparatus by designating a degree of the paper saving manner.

The global environment enhancing feature used by the electronic apparatus according to eighteenth aspect of the present invention is a toner saving feature, and the goal setting unit sets a toner consumption saving level of the electronic apparatus by designating a degree of the toner saving feature.

The electronic apparatus according to a nineteenth aspect of the present invention has a power saving button on an operation panel, and plural kinds of saving levels, which are set by the goal setting unit, are simultaneously set to a predetermined condition in response to the power saving button being operated.

The evaluating unit used by the electronic apparatus according to a twentieth aspect of the present invention includes a feature to evaluate a status of accomplishment of a goal set by the goal setting unit, and further includes a navigation unit that gives a user guidance about a manner to use the apparatus for accomplishing a goal that is set beforehand.

The electronic apparatus according to a twenty-first aspect of the present invention is connected via a line to a superordinate apparatus that performs a summing process, and sends an evaluation result obtained by the evaluating unit to the superordinate apparatus.

The electronic apparatus according to a twenty-second aspect of the present invention is connected via Internet line to a remote management center facility that performs a process of summing eco achievement of each electronic apparatus, and sends an evaluation result obtained by the evaluating unit to the management center.

The electronic apparatus according to a twenty-third aspect of the present invention prints an evaluation result obtained by the evaluating unit on a recording medium.

The electronic apparatus according to a twenty-fourth aspect of the present invention is an electronic apparatus that operates with a replaceable replacement part attached in a body of the electronic apparatus, and includes: a replacement part attachment supporting unit that supports the replacement part to the body in an attachable and detachable manner; a detecting unit that detects identification information that indicates that a right to emit GHG is accorded to the replacement part, from the replacement part, which is attached in the body; an evaluating unit that evaluates a degree of contribution by the electronic apparatus to an activity for reducing the GHG, in response to detection of the identification information; and a displaying unit that displays an evaluation result obtained by the evaluating unit.

The replacement part according to a twenty-fifth aspect of the present invention is a replacement part that is replaceable in a body of an apparatus, completes its life span by being used by the apparatus for a preset period of time while it is set inside the body, and as a result is replaced with a new replacement part, thereby keeping the apparatus functioning, the replacement part is affixed with identification information that indicates that a right to emit GHG is accorded to the replacement part, the identification information being detected by a detecting unit possessed by the apparatus when the replacement part is attached in the body, and a degree of contribution to an activity for reducing the GHG is evaluated in the apparatus in response to detection of the identification information.

The consumable goods according to a twenty-sixth aspect of the present invention is a consumable goods that is replaceable in a body of an apparatus and affixed with identification information that indicates that a GHG emission right is accorded to the consumable goods, the identification information being read by a reading unit possessed by the apparatus when the consumable goods is attached in the body, the consumable goods, which is set inside the body, being consumed by the apparatus.

A refill unit that is sold with a greenhouse gas emission right accorded is used as a refill unit that is attachable and detachable to/from an electronic apparatus, greenhouse gas reduction is evaluated based on a continuous use status of such refill units, and the evaluation result is displayed on an operation panel or the like, or the evaluation result is printed on a sheet, which makes a user more conscious of greenhouse gas reduction.

A replacement part that is sold with an emission right accorded is used as a replacement part that is attachable and detachable to/from an electronic apparatus, greenhouse gas reduction is evaluated based on a repetitive use status of such replacement parts, and the evaluation result is displayed on a display unit such as an operation panel or printed on a sheet, which makes a user more conscious of greenhouse gas reduction.

BRIEF DESCRIPTION OF THE DRAWINGS

These objects and other objects and advantages of the present invention will become more apparent upon reading of the following detailed description and the accompanying drawings in which:

FIG. 11 is a diagram showing an example of eco goal levels in a relative evaluation mode;

FIG. 13 is a diagram explaining a result of printing operations performed according to the Embodiment 2;

FIG. 15A is a diagram showing an example of eco diagnosis according to the Embodiment 2, FIG. 15B is a diagram showing an example of how to overcome the eco diagnosis, and FIG. 15C is a diagram showing an example of separate diagnoses given on an individual basis and a group basis.

DETAILED DESCRIPTION OF THE PREFERRED EMBODIMENTS

The embodiments of the present invention will be explained below with reference to the drawings.

Embodiment 1

Figure 1:
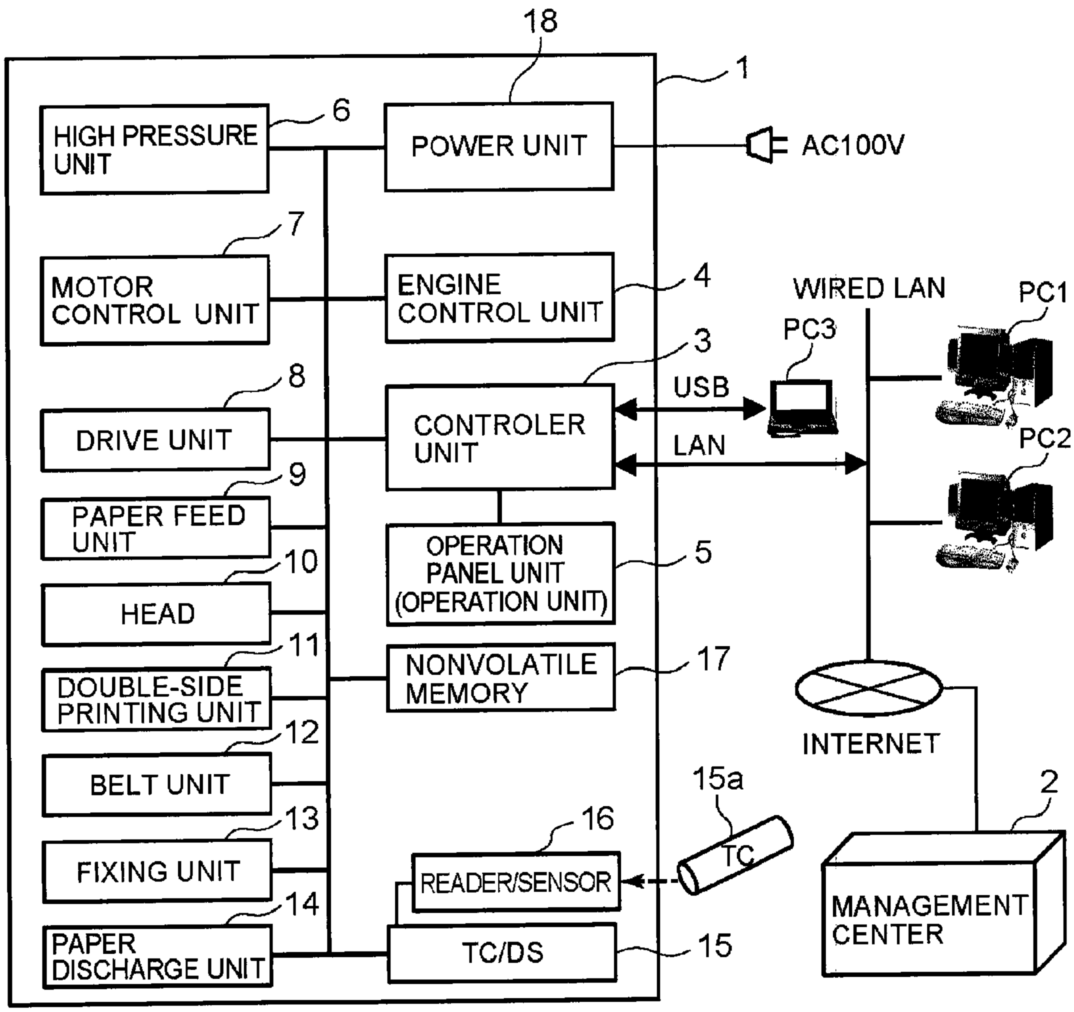
FIG. 1 is a configuration diagram of a computer system including a printer according to the embodiments of the present invention.

FIG. 1 is a configuration diagram of a computer system including a printer according to the present embodiment. In FIG. 1, the printer 1 is connected to a plurality of personal computers (PC1, PC2, etc.) via a Local Area Network (LAN), and to a management center 2 via the Internet. The printer 1 is locally connected to a personal computer (PC3) via a Universal Serial Bus (USB). The printer 1 receives print data from the personal computers (PC1 to PC3, etc.) described above, which are host apparatuses.

The printer 1 includes a controller unit 3, an engine control unit 4, an operation panel unit 5, a high-pressure unit 6, a motor control unit 7, and various mechanisms. Such mechanisms include a drive unit 8, a paper feed unit 9, a head 10, a double-side printing unit 11, a belt unit 12, a fixing unit 13, a paper discharge unit 14, a TC/DS 15, a reader/sensor 16, and a nonvolatile memory 17. The printer 1 includes a power unit 18, which is supplied with commercial power (AC 100V).

The controller unit 3 receives print data supplied by a host apparatus (any of the personal computers (PC1 to PC3), etc.), converts the received print data into bitmap data, and sends it to the engine control unit 4. The controller unit 3 controls the driving of each of the mechanisms described above to print out the bitmap data. The nonvolatile memory 17 records information about the number of times eco TCs have been continuously used (count data by which it is discriminated whether eco TCs are repetitively purchased and used), and a calculation of eco points, which serve as the basis by which an eco use degree described later is evaluated. Note that an “eco TC” is a toner cartridge 15*a*, which is sold with a greenhouse gas emission right attached.

The TC/DS 15 represents a toner cartridge 15*a* and a drum set 15*b*. The toner cartridge 15*a* is a toner refill cartridge that includes a developer in which toner is stored and that is attachable and detachable to/from the printer 1. The drum set 15*b* is a cartridge that includes a photoconductive drum and is attachable and detachable to/from the printer 1 (for replacement). The reader/sensor 16 is provided near the TC/DS 15 to sense whether the toner cartridge 15*a* and the drum set 15*b* are attached or detached (to sense their presence or absence and the presence or absence of an identification sign) and detect identification information about a greenhouse gas emission right (about whether they are the cartridges accorded a greenhouse gas emission right).

Figure 2:
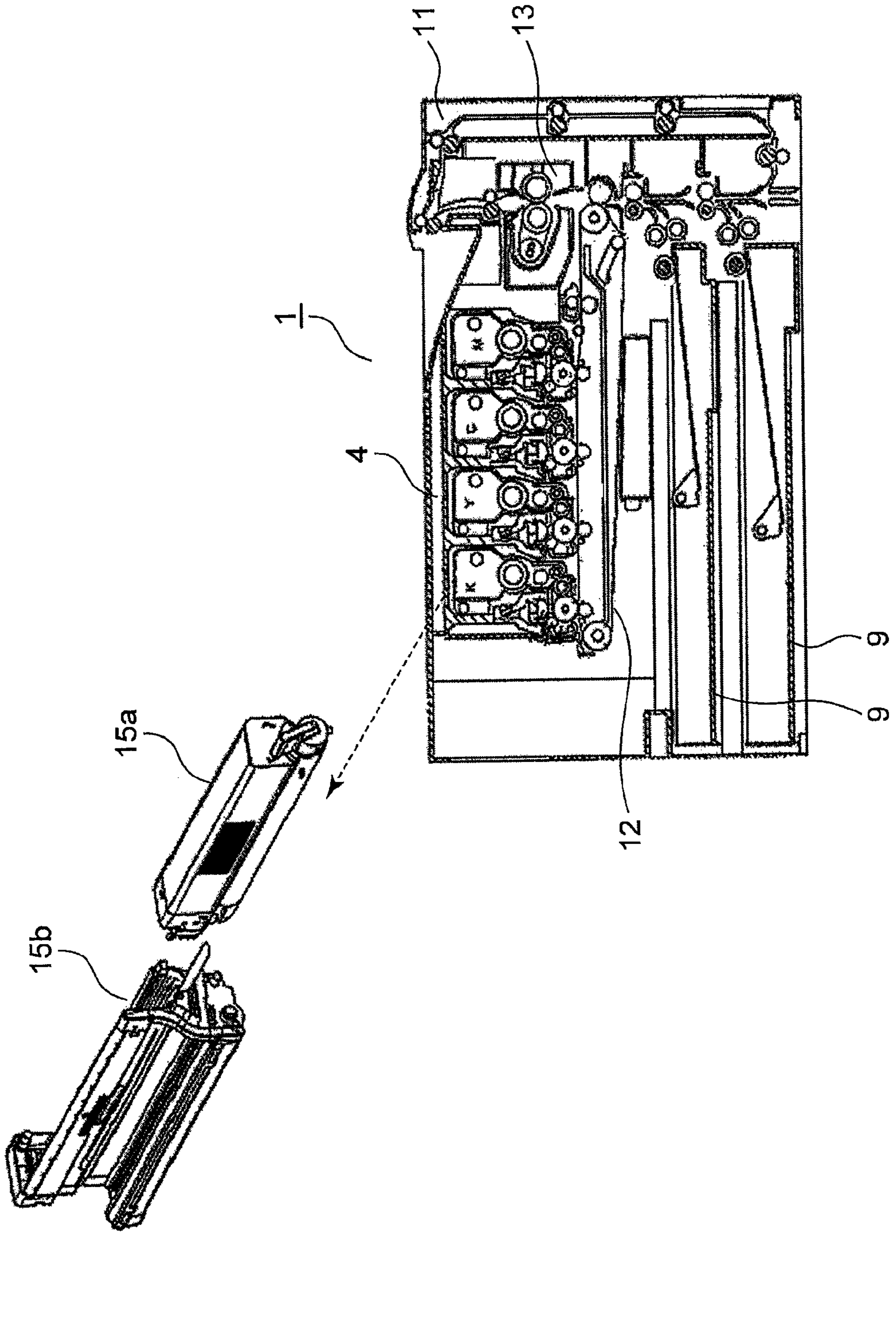
FIG. 2 is a perspective diagram of a toner cartridge and a drum set, showing their positional relationship with respect to a printer.

FIG. 2 is a perspective diagram of the toner cartridge 15*a* and the drum set 15*b*, when they are attached or detached to/from the printer 1. The reference numerals used in FIG. 2 indicate the positions at which the units explained in FIG. 1 are disposed. The toner cartridge 15*a* and the drum set 15*b* are sold with a greenhouse gas emission right attached. This emission right is provided to a purchaser of the toner cartridge 15*a*, etc. by a manufacturer/distributor of the toner cartridge 15*a*, etc., who has bought, as Certified Emission Reduction (CER), on behalf of the user, the (emission) right that amounts to greenhouse gas that is generated when the power, which is to be consumed by the printer 1 during a period in which the printer 1 operates using a cartridge attached by the user, is generated (by a power plant). The printer 1 includes an identifying unit that identifies that the article attached to the printer 1 is the toner cartridge 15*a* or the drum set 15*b* with an emission right. The printer 1 confirms the number of times replacements of refill cartridges have been done, which is identified by the identifying unit, (based on use management information recorded in a nonvolatile storage unit such as an HD), displays an evaluation of an eco use degree (whether eco refills are frequently/continuously used), and displays advice or navigation about ecology.

Certified Emission Reduction (CER) mentioned above is an emission quota (credit) earned in the framework of the Clean Development Mechanism (CDM), and issued for an amount of emission reduction achieved by a CDM project, which amount is determined by a designated institution of the United Nations and verified by the CDM board of directors.

The identification information about accordance of an emission right to the toner cartridge 15*a*, etc. is in the form of pasting of a barcode label or a QR code™ label, mounting of a memory IC, attaching of a Radio Frequency Identification (RFID) tag, or the like. Hence, different types of identification information to be provided to the toner cartridge 15*a*, etc. require different configurations of the reader/sensor 16. For example, in a case where a barcode label or a QR code label is pasted on the toner cartridge 15*a*, etc. as a means to provide identification information indicating that the toner cartridge 15*a*, etc. are accorded a GHG emission right, a known label sensor (reader) is used. In a case where a memory IC is mounted as a means to provide identification information indicating that the toner cartridge 15*a*, etc. are accorded a GHG emission right, a reader (control circuit) that reads out data from the memory IC (via a connector that, when the cartridge is attached, connects the printer body (or the controller in the printer body) to the memory IC in the cartridge in a manner that enables data to be send and received therebetween) is used.

In a case where an RFID tag is used as a means to provide the toner cartridge 15*a*, etc. with identification information indicating that the toner cartridge 15*a*, etc. are accorded an GHG emission right, an RFID tag (RFID sheet) that emits recognition information is pasted on the toner cartridge 15*a*, etc. The RFID sheet is pasted at a position that will be at a predetermined (communicable) distance from an antenna on a printer control board mounted in the printer 1 when the toner cartridge 15*a*, etc. are attached to the printer 1. The RFID sheet (RFID tag) and the reader/sensor 16 (receiver), which is disposed on the printer control board, contactlessly communicate with each other via the antenna.

A process operation of the present example having the above-described configuration will be explained below.

Figure 3:
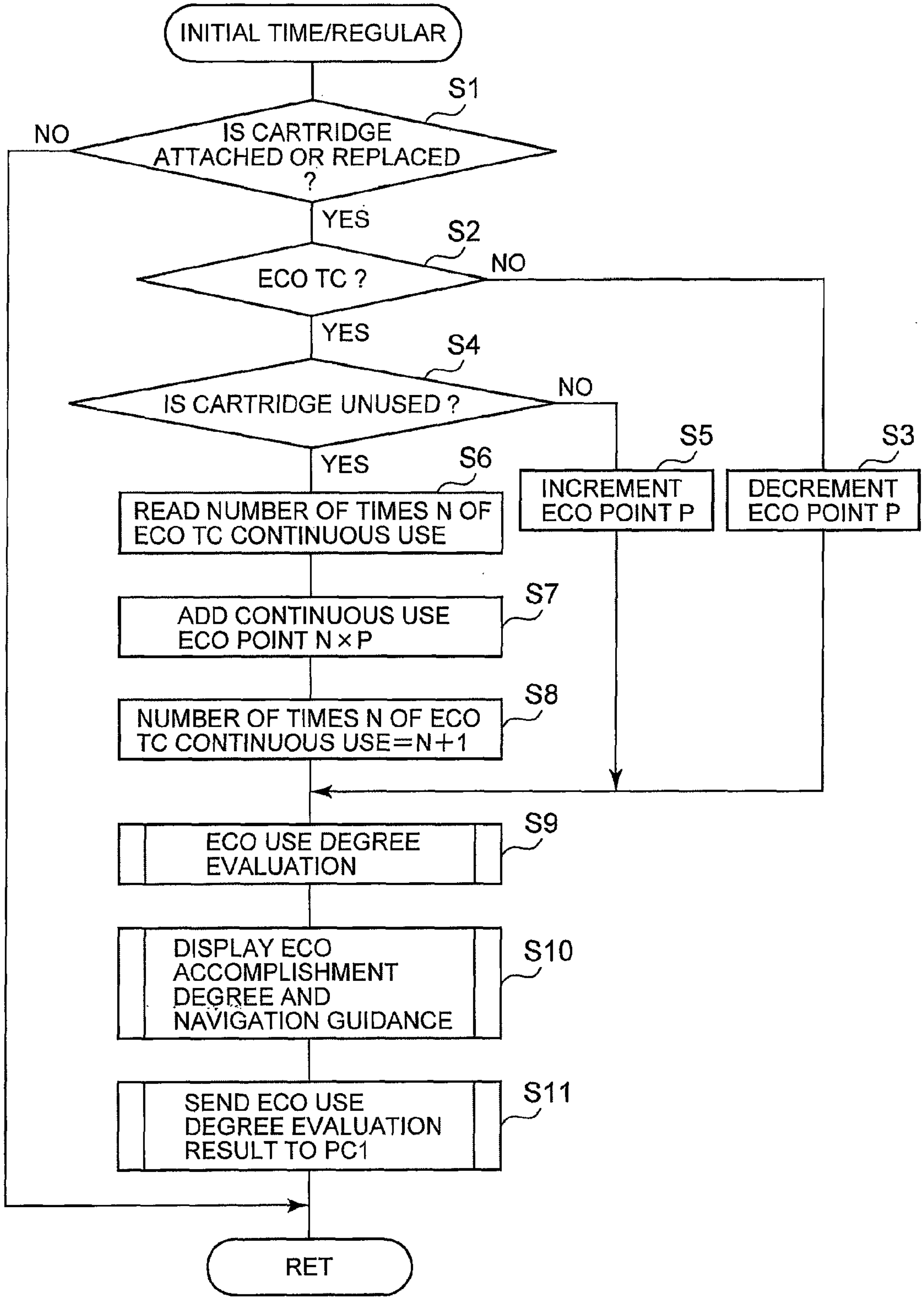
FIG. 3 is a flowchart explaining a process operation according to Embodiment 1.

FIG. 3 is a flowchart that explains the process operation of the present example. In FIG. 3, it is first determined whether attachment of a cartridge or replacement of cartridges has been performed (step (hereinafter "S") 1). In this determination, it is determined whether the user has replaced the toner cartridge 15*a* with a new one in a case where, for example, the printer 1 has been used to perform printing operations according to print data sent from the host apparatuses (the personal computers (PC1 and the like)), and consequently the toner stored in the toner cartridge 15*a* has been consumed and become short.

Hence, in a case where attachment of the toner cartridge 15*a* or replacement of cartridges has not been performed (S1; NO), the process operation of the present example will not be performed. On the other hand, in a case where attachment of the toner cartridge 15*a* or replacement of cartridges has been performed (S1; YES), it is determined whether the attached or replaced new toner cartridge 15*a* is a cartridge accorded a greenhouse gas emission right described above (S2). This determination is to confirm, by using the reader/sensor 16, that the identification information described above is provided on the toner cartridge 15*a*.

In a case where the toner cartridge is not the toner cartridge 15*a* accorded a greenhouse gas emission right (S2; NO), an eco point P is decremented (S3). The eco point P is the basis of evaluating the degree of cooperation in reducing greenhouse gas, and greenhouse gas reduction is evaluated based on the eco point P in a way described later.

On the other hand, in a case the determination (S2) finds that the attached or replaced new toner cartridge 15*a* is a product with a greenhouse gas emission right (S2; YES), it is further determined whether the cartridge is an unused product or not (S4). In a case where the attached cartridge is not an unused product (S4; NO), the eco point P is incremented (S5). On the other hand, in a case where the attached cartridge is an unused product (S4; YES), the number of times N eco TCs have been continuously used, which is stored in the nonvolatile memory 17, is read out (S6), and $N \times P$, which is a continuous use eco point, is added (S7). That is, the eco point P is multiplied by the number of times N, and the product $N \times P$ is added to the eco point. After this, the number of times N eco TCs have been continuously used is incremented to N+1 (S8).

Next, evaluation of an eco use degree is performed (S9). The evaluation of the eco use degree is performed according to the result of calculation of the eco point. In a case where toner cartridges 15*a* with an emission right have been continuously used, the evaluation point will be high as can be understood from the above calculation manner, and in a case where not many toner cartridges 15*a* with an emission right have been used, the evaluation point will be low. Hence, the frequency of use of toner cartridges 15*a* with an emission right determines the evaluation of the eco use degree. The eco point calculation manner described above is an example, and any calculation manner may be used as long as it can evaluate the frequency of use of eco TCs.

Figure 4:
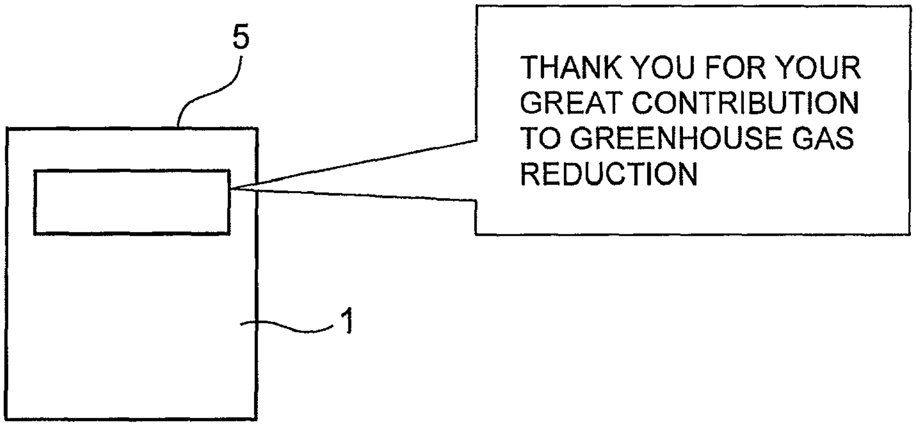
FIG. 4 is a diagram showing an example of display on an operation panel unit.

Next, according to the evaluation result, the evaluated eco use degree is displayed on a display device provided to the operation panel unit 5, and navigational guidance is displayed (S10). FIG. 4 is a diagram showing a display example on the display device of the operation panel unit 5, which is an example of when the evaluation of the eco use degree is high, and indicates, for example, that "Thank you for your great contribution to green house gas reduction." On the other hand, when the evaluation of the eco use degree is low, for example, a message that "You are not cooperative to greenhouse gas reduction. We would strongly appreciate your cooperation to global environmental improvement based on eco product use" is displayed.

Next, the evaluation result of the eco use degree is sent to the personal computer (PC1), the host apparatus, via, for example, a LAN, so that the evaluation result may be summed (S11).

Figure 5:
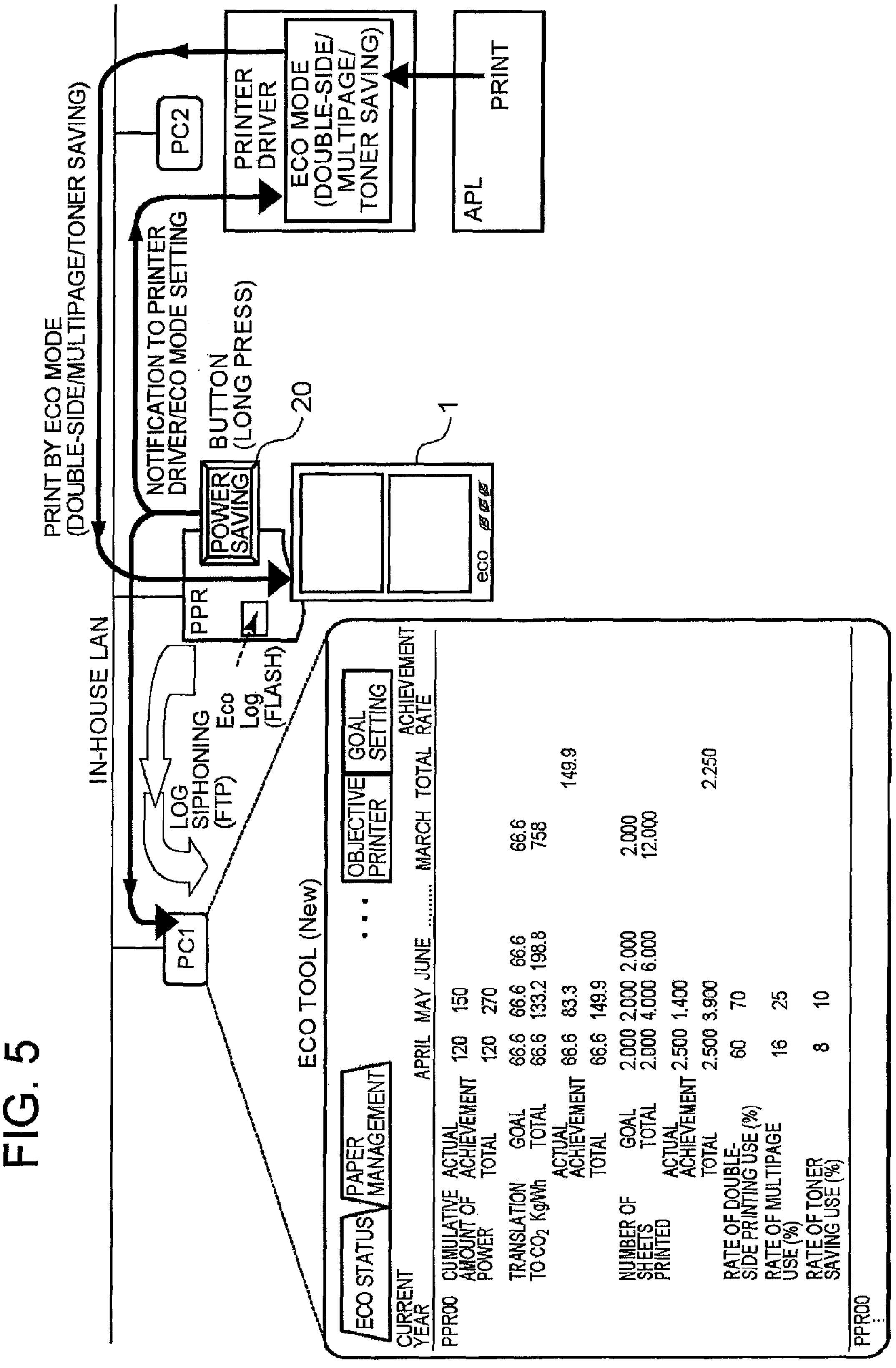
FIG. 5 is a diagram explaining a summing process.

FIG. 5 is a diagram that explains the summing process. The personal computer (PC1) siphons eco use mode logs from the printer 1 and displays them on the display. For example, in the example of FIG. 5, an eco status tab is displayed, under which the current year's achievements of each printer are displayed as a cumulative amount of power, its equivalent translated into a $CO_2$ amount, a number of sheets printed, a rate of double-side printing use, a rate of multipage printing use, and a rate of toner saving use. Note that the personal computer (PC1) manages sheets of paper not only in the eco use mode described above, but in an ordinary manner.

The operation panel unit 5 of the printer 1 of the present example has a power saving button 20 by which the printer 1 is switched to a power saving mode operation. For example, by an operator giving a long press to the power saving button 20, a plurality of eco mode terms can be changed simultaneously by one operation to predetermined settings that are the most preferable, and the printer driver of the personal computers (PC1, PC2, etc.) that are connected to the printer 1 via the LAN is notified of the simultaneous eco mode setting. That is, the printer of the present invention has a plurality of terms by which an eco mode is set, including, for example, a batch printing feature, a double-side printing feature, a multipage printing (2-in-1 printing, N-in-1 printing) feature, a toner saving feature, etc., and these terms are not set ready one by one. Instead, only one long press of the power saving button 20 enables the plurality of terms related to the eco mode of the printer driver to be forcibly set simultaneously.

In the example described above, the evaluation result of the eco use degree is sent to the personal computer (PC1), but it may be sent to the management center 2 via the Internet, so that the management center 2 may sum the eco achievements of the printer that exists on the net.

Figure 6:
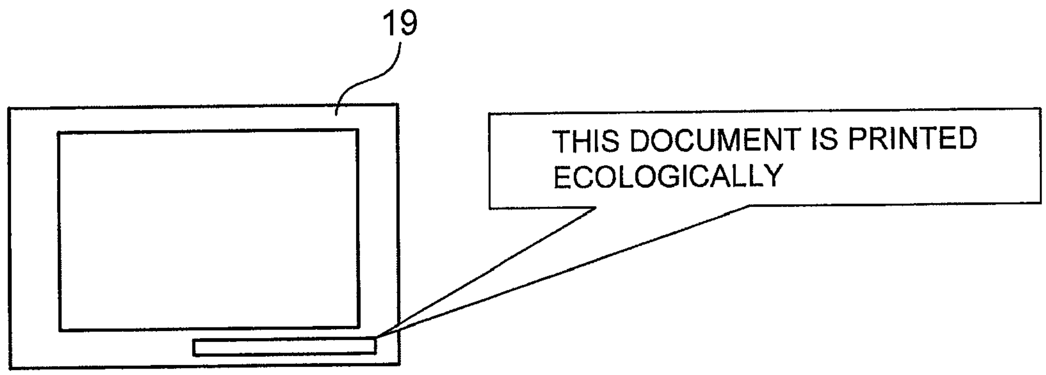
FIG. 6 is a diagram showing an example in which an evaluation result is printed on a corner of a printed output (sheet)
Figure 7:
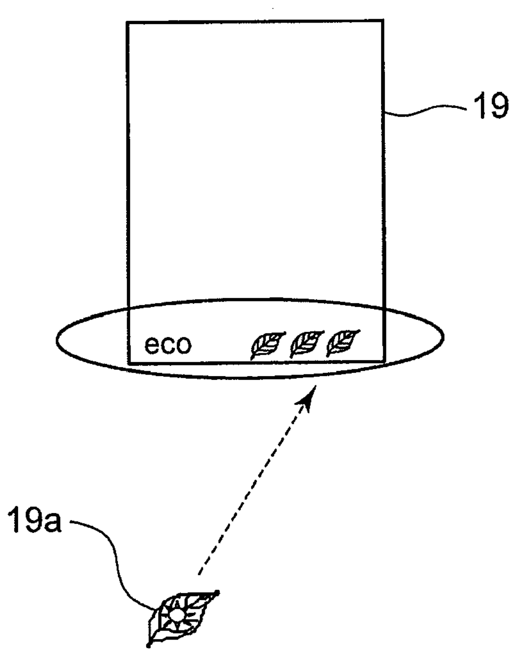
FIG. 7 is a diagram showing an example in which young leaf marks are printed on a sheet.

In the example described above, the evaluation of the eco use degree is displayed on the operation panel unit 5, but it may be printed out as a printed output (sheet 19) as shown in FIG. 6. Further, as shown in FIG. 7, a young leaf mark may be printed. In a case where the evaluation of the eco use degree is high, many young leaf marks may be printed, with a special mark 19*a* printed on part of the young leaf marks to indicate that the evaluation of the eco use degree is high (that an eco product with an emission right has been used to perform this printing).

In the description of the present embodiment, the toner cartridge 15*a* that is sold with a greenhouse gas emission right accorded has been explained as a refill product that the user of the printer has to purchase after a certain period of time of use. However, not only a refill product but a replacement part such as the drum set 15*b*, which the user will purchase and attach to the printer after a predetermined period of time elapses may be sold with a greenhouse gas emission right accorded, and an ecology contribution display may be output on the operation panel unit 5 based on the number of times such replacement parts have been replaced, i.e., the use of the drum set 15*b*. That is, replacement parts with an emission right may be the structural parts in the printer that require regular replacement, for example, the belt unit, the fixing unit, the print head unit, etc., and may be anything as long as it is purchased by the user at his/her cost for using the printer.

As described above, the present example aims for making the user more conscious of greenhouse gas reduction, by using the toner cartridge 15*a* and the drum set 15*b* with an emission right as refill cartridges (refill units), evaluating greenhouse gas emissions based on the use status of these cartridges, displaying the evaluation on the operation panel unit 5, and printing the evaluation on a sheet of paper.

The printer used in the present example is not limited to the electrophotographic type described above, but may be an inkjet type, a thermal transfer type, etc. The objective refill cartridge may not necessarily be the toner cartridge 15*a* or the drum set 15*b*, but may be an ink ribbon, a receptacle cartridge for sheets of paper, etc.

Figure 8:
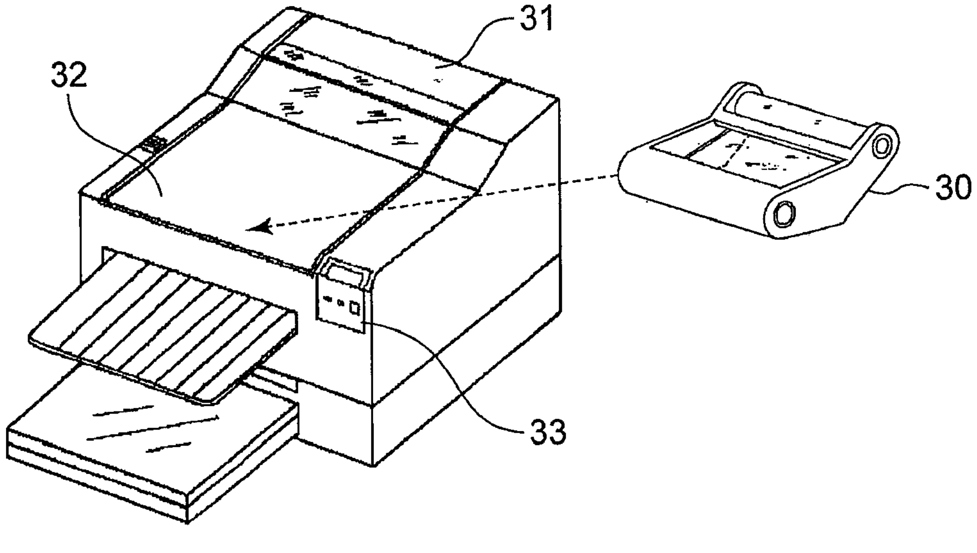
FIG. 8 is a diagram explaining an example in which the present embodiment is applied to a thermal transfer type printer.

FIG. 8 is an example in which the present invention is applied to a thermal transfer type printer. In this configuration, a thermal ribbon 30 is attachable and detachable to/from the printer 31, and when the thermal ribbon 30, which is accorded an emission right, is attached to an attachment section 32 of the printer 31, an unillustrated reader/sensor provided in the printer 31 detects that the thermal ribbon 30 with an emission right is attached on the printer. In this case, the printer 31 performs printing operations, measures the number of times of replacements each time the thermal ribbon 30 with an emission right is replaced with a new one, displays an evaluation of an eco use degree on a display unit 33, and displays guidance or navigation about ecology.

Figure 9:
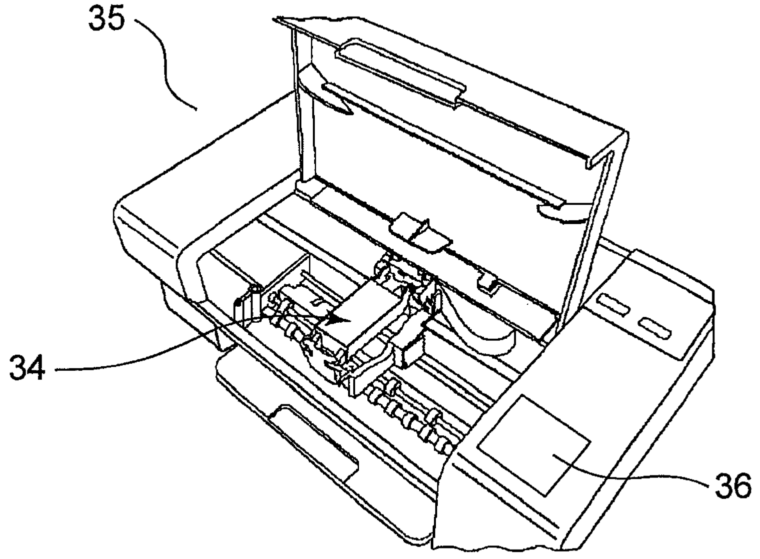
FIG. 9 is a diagram explaining an example in which the present embodiment is applied to an inkjet type printer.

FIG. 9 is an example in which the present invention is applied to an inkjet type printer. In this configuration, an ink bottle cartridge (ink refill) 34 is attachable and detachable to/from the printer 35, when the ink bottle cartridge (ink refill) 34, which is accorded an emission right, is attached to an attachment section of the printer 35, a reader/sensor provided in the printer 35 detects the emission right. In this case, the printer 35 performs printing operations, measures the number of times of replacements each time the ink bottle cartridge 34 with an emission right is replaced with a new one, likewise displays an evaluation of an eco use degree on a display unit 36, and displays guidance or navigation about ecology.

In a case where replenishment sheets are sold in the form of a cartridge, the replenishment sheet cartridge may be sold with an emission right. Such a cartridge may be attached to the paper feed section of a printer and the printer may measure the number of times such cartridges are attached. This enables the printer to display an evaluation of an eco use degree and guidance or navigation about ecology on its display unit.

Note that the objective electronic apparatus may not necessarily be a printer described above, but the present invention can be applied to OA apparatuses such as a facsimile apparatus, etc. that use a refill cartridge, and to a wide variety of industrial instruments.

Further, the present invention may be embodied in a mode that a battery for an electronic apparatus that runs on a battery is sold with an emission right and the electronic apparatus discriminates use of a battery with an emission right and displays an ecology contribution degree.

For example, a battery for an electronic apparatus that runs on a battery, such as a cellular phone, a digital camera, a portable electronic apparatus, etc. may be sold with a greenhouse gas emission right accorded as in the embodiment described above, and a function for identifying that a battery is accorded a greenhouse gas emission right may be provided to the electronic apparatus as in the embodiment described above. For example, the manner to accord may be printing a barcode label on the battery or pasting an RFID label on the battery. Correspondingly, a reader that reads the identification information may be provided at the battery attachment portion of the electronic apparatus body. When the reader reads information that indicates that the attached battery is a battery accorded a greenhouse gas emission right, the electronic apparatus may present the user with a display of a degree of contribution to cooperation in a global environmental enhancement activity or a display of an acknowledging message by using a display device or the like or present the user with such information by audio and manage accumulation of eco cooperation points according to the features of the electronic apparatus. In this way, the user of an objective apparatus can receive various advantages, such as benefits according to the quantity of eco points, including a discount of the sales price of a replacement/refill product, free-of-charge pickup of a used-up refill product, etc., and can help the global environmental protection activity.

The electronic apparatus is not limited to a printer, a copying machine, etc., or to portable electronic apparatuses. Needless to say, the present invention can also be applied to a vehicle that requires a refill product or a replacement part, and emits greenhouse gas (the relationship between an electric vehicle and a battery, etc.)

That is, the present invention may be embodied in a mode that a replaceable fuel cartridge for an apparatus that runs on a fuel is sold with an emission right accorded, and the apparatus identifies a fuel cartridge with an emission right and displays an ecology cooperation degree.

The refill cartridge may be a product that requires regular replacement as described above, and the eco use status of each user may be managed and evaluated, so that an excellent user may receive benefits such as discount sales of a refill cartridge or a product that requires regular replacement, etc.

By utilizing such a system that contributes global environmental enhancement according to the present invention, a user of an electronic apparatus or a refill product/replacement product can greatly contribute to greenhouse gas reduction and hence to global environmental enhancement without participating in a special cooperation activity or shouldering a huge financial burden.

Embodiment 2

Next, the Embodiment 2 of the present invention will be explained.

According to the present embodiment, a printer having global environmental enhancement features displays a degree of accomplishment of a greenhouse gas reduction goal according to the use status of these features on a display of an operation panel, and gives navigation that helps the operator accomplish the reduction goal by means of display on the operation panel. A detailed explanation will now be given. In the present example too, explanation about a case in which the electronic apparatus to be used is the printer shown in FIG. 1 will be given. The global environmental enhancement features are a "power saving" feature, a "paper saving" feature, and a "toner saving" feature, which are to be described later.

Figure 10:
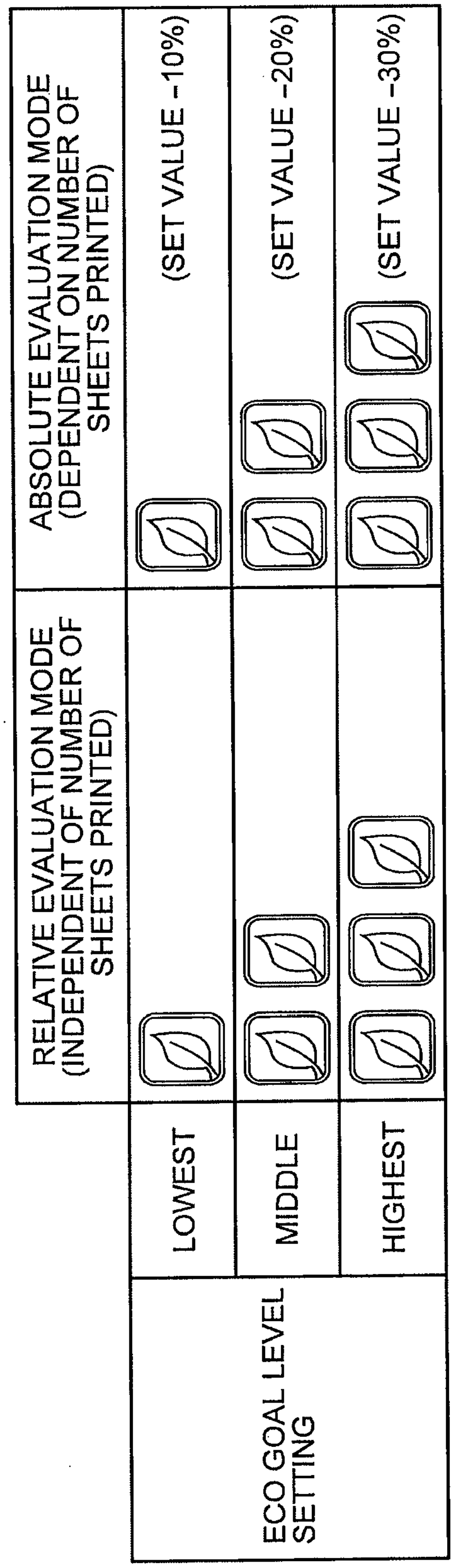
FIG. 10 is a diagram showing an example of eco goal level setting in the Embodiment 2.

In the present example, first, an eco goal level that can be accomplished with the use of the global environmental enhancement features possessed by the printer according to the present invention is entered from the operation panel unit 5. FIG. 10 is a diagram that shows an example of terms to which eco goal levels are set. The terms include a relative evaluation mode and an absolute evaluation mode, to each of which an eco goal level is set. The relative evaluation mode is a mode that is independent of the number of sheets of paper printed by the printer 1, and in which mode, the degree of how an eco activity is accomplished is visibly indicated based on, for example, a result of evaluation of execution of a use mode (global environmental enhancement feature 1) of the printer in which the printer performs a printing operation by saving power required to print a sheet, a use mode (global environmental enhancement feature 2) of the printer in which the printer performs a printing operation by saving sheets of paper, and a use mode (global environmental enhancement feature 3) of the printer in which the printer performs a printing operation by saving toner. Meanwhile, the absolute evaluation mode is a mode that is dependent only on the number of sheets of paper printed, and in which mode, a degree of accomplishment of an eco activity, which is to save the absolute amount of use of the printer, is evaluated and displayed.

FIG. 10 shows how eco goal levels are set for the absolute evaluation mode. Specifically, the apparatus user sets beforehand a standard number of sheets used (for example, it is supposed here that 10,000 sheets per month is the normal amount of use). Based on this, the lowest goal level is set to "the set value−10%" (i.e., a use of 9,000 sheets per month), the middle goal level is set to "the set value−20%" (i.e., a use of 8,000 sheets per month), and the highest goal level is set to "the set value−30%" (i.e., a use of 7,000 sheets per month) as the values of the reduction goal.

FIG. 11 shows an example of terms to which an eco goal level (degree of accomplishment) is set in the relative evaluation mode. FIG. 11 shows an example setting of each goal level for eco mode use with respect to a predefined standard, about three factors for $CO_2$ reduction, namely "power saving", which is a global environmental enhancement feature 1, "paper saving", which is a global environmental enhancement feature 2, and "toner saving", which is a global environmental enhancement feature 3. In the global environmental enhancement feature 1, a batch printing manner is used to buffer a plurality of print jobs that are entered at random intervals to process the jobs simultaneously and thereby to reduce the power consumed by the printer, which leads to GHG emissions reduction. In the global environmental enhancement feature 2, an N-in-1 printing manner, by which the contents of N pages are printed collectively in one page, is used to reduce the amount of sheets used and thereby to reduce the power required to fabricate sheets, which leads to GHG emissions reduction. In the global environmental enhancement feature 3, a toner saving mode, in which the printing darkness is reduced, is used to reduce the amount of toner used and to reduce the power required to fabricate toner, which leads to GHG emissions reduction. For example, as regards the "power saving" factor (eco by batch printing), an eco level is set based on the number of sheets that are to be printed simultaneously in a batch, and based on a standard case in which the number of sheets to be printed simultaneously in a batch is one (1PJ), a case in which the number of sheets to be printed simultaneously in a batch is three (3PJ) is set as "level 1", and a case in which the number of sheets to be printed simultaneously in a batch is five (5PJ) is set as "level 2", and a case in which the number of sheets to be printed simultaneously in a batch is ten (10PJ) is set as "level 3". Here, "*PJ" indicates the batching degree of the batch printing mode, which indicates how many printing jobs that occur in the sequential order of page numbers are batched for each printing operation (batch printing can widen the interval between the batch jobs and lengthen the sleep period of the printer and thereby can reduce the power consumed by the printer). The value*indicates the number of sheets that are to be printed in a batch. That is, normally, when print data is entered and even if the print data contains only one page, a printing operation is performed for that entered one page (which is 1PJ). Meanwhile, nPJ is a power saving mode in which a printing operation is not started until print data that are entered pile up to n pages. (The standard value is 1PJ, which is a mode in which power is not saved (restriction on $CO_2$ emissions is low.) (n is a positive integer.)

To further detail FIG. 11, the printer of the present example is supposed to consume 200 Wh power for printing 100 sheets, if the printing operation is performed in the 1PJ printing mode that is set as the standard. When calculating the amount of $CO_2$ to be emitted per sheet to be printed based on these values, since the power required to print one sheet is about 2 Wh, the answer (i.e., $CO_2$ emission amount, which is to be used as a standard value) is 2 Wh×a (where a indicates the amount of $CO_2$ emitted per 1 Wh power). Accordingly, with reference to this standard value, in a case where the "power saving" factor is set to "level 1" in which the printing mode is 3PJ, the amount of $CO_2$ emitted per sheet to be printed is (1.7 Wh×a)g. Likewise, in the case of "level 2" in which the printing mode is 5PJ, the amount of $CO_2$ emitted per sheet to be printed is (1.5 Wh×a)g. In the case of "level 3" in which the printing mode is 10PJ, the amount of $CO_2$ emitted per sheet to be printed is (1.0 Wh×a)g. Further, supposing that the amount of $CO_2$ reduction in the standard mode in which nothing special is done is 0.00, the amount of $CO_2$ reduction in each case is (0.3 Wh×a)g in the case of "level 1", (0.5 Wh×a)g in the case of "level 2", and (1.0 Wh×a)g in the case of "level 3", which are translated to a reduction rate of 15% in the case of "level 1", 25% in the case of "level 2", and 50% in the case of "level 3", as can be seen from FIG. 11.

FIG. 11 tells similar things about the "paper saving" factor (eco by N-in-1 printing by which the contents of N pages are printed collectively in one page). The printing modes of this factor include a standard mode, a "level 1" mode, a "level 2" mode and a "level 3" mode. In the standard mode, one page data is printed on only one side of a sheet and the back side is left unprinted (no saving is accomplished). In the "level 1" mode, one page data is printed on each side of a sheet, so data is printed on both sides of a sheet, thereby two page data is printed on one sheet (consumption of one sheet is saved with respect to the standard). In the "level 2" mode, two page data is multi-printed on only one side of a sheet and the back side is left unprinted (consumption of one sheet is saved with respect to the standard). In the "level 3" mode, two page data is multi-printed on each side of a sheet (consumption of three sheets is saved with respect to the standard). Supposing that the amount of $CO_2$ emitted per sheet for its fabrication is b gram, by saving the amount of sheets consumed, the "level 1" mode and the "level 2" mode reduce $CO_2$ emissions by b gram, which corresponds to saving of one sheet, and the "level 3" mode reduces $CO_2$ emissions by 3×b gram, which corresponds to saving of three sheets. To translate the reduction amounts into a reduction rate, the "level 1" mode and the "level 2" mode reduce $CO_2$ that is generated when a sheet is fabricated by 50%, and the "level 3" mode reduces $CO_2$ by 75%, as is explained in FIG. 11.

FIG. 11 also tells similar things about the "toner saving" factor (eco by a printing operation that uses a toner saving mode). With respect to a standard printing mode that does not employ toner saving (toner saving printing), "level 1" is set as a 15% toner saving mode (a mode in which printing is performed at a printing darkness that is 15% less than the standard to save toner), "level 2" is set as a 30% toner saving mode (a mode in which printing is performed at a printing darkness that is 30% less than the standard to save toner), and "level 3" is set as a 50% toner saving mode (a mode in which printing is performed at a printing darkness that is 50% less than the standard to save toner). Supposing that d gram of toner is consumed per sheet when the sheet is printed at the standard darkness and that c gram of $CO_2$ is generated during a toner fabrication process for fabrication of 1 gram of toner, a standard printing operation that does not employ a toner saving mode generates c×d gram of $CO_2$, while a "level 1" mode operation can prevent 15% of that amount, i.e., c×d×0.15 gram of $CO_2$ from being generated, a "level 2" mode operation can prevent 30% of that amount, i.e., c×d×0.3 gram of $CO_2$ from being generated, and a "level 3" mode operation can prevent 50% of that amount, i.e., c×d×0.5 gram of $CO_2$ from being generated, as is explained in FIG. 11.

Hence, the invention of the Embodiment 2 is to evaluate the user's manner of using the printer in terms of whether the user uses the printer in eco-conscious manner based on the above-described three features (power saving, paper saving, toner saving) of the printer that will lead to GHG emissions reduction, and to show the user by display etc. what degree the user has accomplished of the eco level that the user has beforehand selected and set as the goal and what are preferred as steps to take according to the accomplishment status.

Then, in the present example, the eco level goal is divided into three stages, namely "level 1" to "level 3", and the user can freely select a goal. Based on the goal level that is selected beforehand, an eco use degree (a contribution degree that indicates the level of use of the printer with an eco-cooperative action) is evaluated in the subsequent printing operations.

Figure 12:
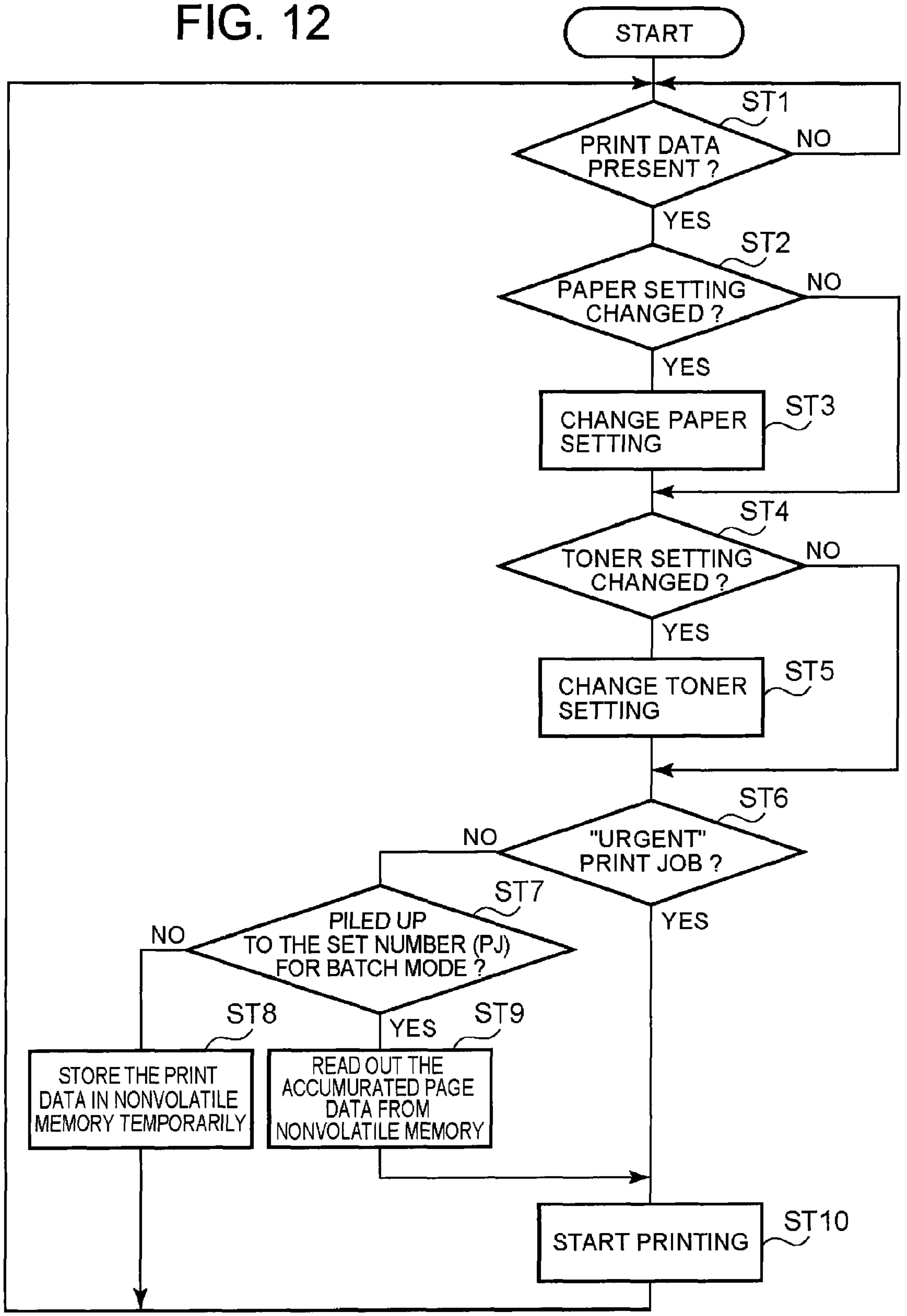
FIG. 12 is a flowchart explaining a process operation according to the Embodiment 2.

FIG. 12 is a flowchart that explains the process of the present example, and the process is performed on the basis that the eco level set by the user is the default status. Starting with this status, if no change is made to the set eco level (step (hereinafter, "ST") 1; YES, ST2; NO, and ST4; NO), and if the print job is not an urgent one (that cannot take batch operation) (ST6; NO), the PJ value that indicates the number of sheets to be batched for batch printing is checked. If print jobs have not piled up to the set PJ value, data indicating the number of sheets to be printed is written into an unillustrated nonvolatile memory such as a hard disk (HD) (ST7; NO, ST8). If print jobs have piled up to the set PJ value, corresponding print data are read out from the nonvolatile memory such as a hard disk (HD) and a printing operation is performed (ST7; YES, ST9, ST10).

On the other hand, in case of emergency or in a case where an important document needs to be generated, a printing operation is performed upon change of the above default status. For example, in a case where it is necessary to print an important document and distribute it in the workplace, the paper setting is changed (ST2; YES, ST3), the toner setting is changed (ST4; YES, ST5), urgent printing is selected (ST6), and then a printing operation is performed (ST10). Further, in a case where it is necessary to distribute a makeshift document in the workplace urgently, a printing operation is performed (ST10) with urgent printing selected (ST6) and with the paper setting, etc. unchanged.

FIG. 13 shows a case in which printing operations have been performed according to the process described above while the eco goal level is set to "level 1", but the achievements resulting from the actual uses reveal that the user has used the intended manner at only 50% of the printing occasions as regards the "power saving" factor, likewise the user has used the intended manner at only 50% of the printing occasions as regards the "paper saving" factor, and the user has used the intended mode at only 60% of the printing occasions as regards the "toner saving" factor, and hence the total accomplishment degree is 53%. FIG. 13 shows one example, and the eco accomplishment degree of 53% is a value obtained by dividing by 3 the total sum of the power saving accomplishment degree, the paper saving accomplishment degree, and the toner saving accomplishment degree shown in FIG. 13 (average value).

Figure 14:
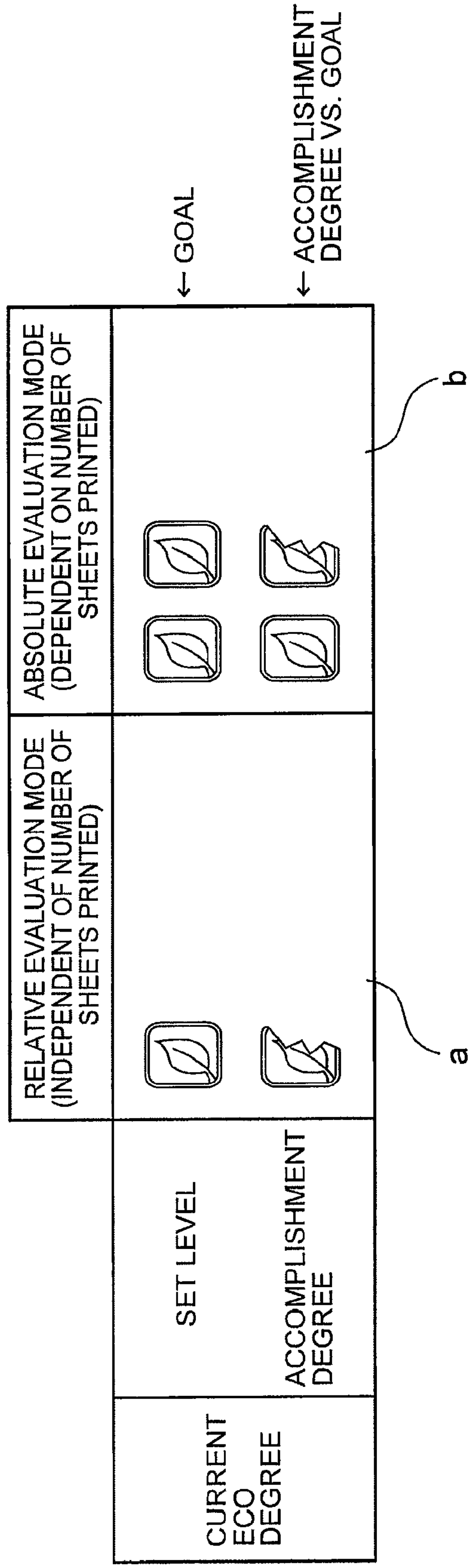
FIG. 14 is a diagram showing an example of an eco accomplishment degree calculation result being displayed on the operation panel unit.

FIG. 14 is an example of the above calculation result being displayed on the display device of the operation panel unit 5. The symbol as shown in FIG. 14 points to a display corresponding to the relative evaluation mode and the symbol b shown in FIG. 14 points to an example display corresponding to the absolute evaluation mode. In each case, the display shows a young leaf mark that is made incomplete according to the actual accomplishment degree, and the user can visually recognize the eco accomplishment degree of the printer 1.

Likewise as described above, young leaf marks may be printed out. In a case where the evaluation of the eco use degree is high, many young leaf marks may be printed and a special mark may be printed on part of the young leaf marks.

FIG. 15 shows examples in which a diagnosis and advice are given for each of the factors described above. For example, in the example shown in FIG. 15A, the evaluations displayed in the relative evaluation mode show that "the accomplishment degree (rate) is 60%" as the evaluation of the "power saving" factor and that "you have used 1PJ mode (1PJ printing) many times", etc., and the evaluations displayed in the absolute evaluation mode, which considers only the number of sheets printed, show that "you have used (consumed) many sheets", etc. As regards paper, toner, etc. too, a display corresponding to the accomplishment degree is given as shown in FIG. 15A.

The ecology navigation feature shown in FIG. 15B is to display guidance about in what way the goal can be accomplished with respect to the above evaluations given for the relative evaluation mode and the absolute evaluation mode. For example, in a case where the evaluation on "power saving" is that "you have used 1PJ printing many times", the navigation to be displayed may be that "you are encouraged to print at 2PJ or higher power saving setting (you are encouraged to print at 2PJ or higher power setting)". As regards other factors too, a corresponding display can be given.

The eco diagnosis shown in FIG. 15C is to give a diagnosis on an individual basis and on a group basis separately, and a display corresponding to the accomplishment degree is given for the relative evaluation mode and the absolute evaluation mode.

It is desired that the goal accomplishment status display and the navigation described in the Embodiment 2 be given under a state in which it is recognized that the refill product/replacement part or the like according to the Embodiment 1 (to which a greenhouse gas emission right is accorded) is attached on the printer body.

In the explanation of the embodiments described above, $CO_2$ has been the example of greenhouse gas. However, the present invention is applicable to any other greenhouse gas, for example, methane ($CH_4$), nitrous oxide ($N_2O$) (=dinitrogen monoxide), hydrofluorocarbon series (HFCs), perfluorocarbon series (PFCs), and sulfur hexafluoride (SF6).

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2008-158730 filed on Jun. 18, 2008 and including specification, claims, drawings and summary. The disclosure of the above Japanese Patent Application is incorporated herein by reference in its entirety.

What is claimed is:

1. An electronic apparatus that operates with a replaceable consumable entity attached in a body of the electronic apparatus, comprising:

a consumable entity attachment supporting unit that supports the consumable entity in the body in an attachable and detachable manner, wherein the consumable entity is either a consumable entity to which a right to emit greenhouse gas (GHG) has been accorded or a conventional consumable entity to which the right to emit GHG has not been accorded;

a detecting unit that is configured to detect, from the consumable entity supported in the body by the consumable entity attachment supporting unit, identification information indicating whether the right to emit GHG has been accorded to the consumable entity;

a memory unit that stores an updatable use status corresponding to at least one consumable entity to which the right to emit GHG has been accorded;

an evaluating unit that evaluates a degree of contribution by the electronic apparatus to an activity for reducing GHG, based on the use status stored in the memory unit;

a displaying unit that displays an evaluation result obtained by the evaluating unit; and a printer capable of printing the evaluation result on a recording medium;

wherein the right to emit GHG accorded to the consumable entity supported by the consumable entity attachment supporting unit is provided to a purchaser of the consumable entity by a manufacturer/distributor of the consumable entity as CER (Certified Emission Reduction) that corresponds to amounts of GHG generated when power, which is to be consumed during a time period in which the electronic apparatus using the consumable entity is operated, is generated.

2. The electronic apparatus according to claim 1, wherein the use status corresponds to a frequency of use of at least one consumable entity that is accorded the right to emit GHG.

3. The electronic apparatus according to claim 1, wherein the use status corresponds to a continuous use status of consumable entities that are accorded the right to emit GHG.

4. The electronic apparatus according to claim 1, wherein the evaluating unit obtains the evaluation result by incrementing or decrementing a predetermined point according to a frequency of use or a continuous use status of at least one consumable entity that is accorded the right to emit GHG, and wherein the evaluating unit provides a benefit to a user of the electronic apparatus according to a finally obtained level of said predetermined point.

5. The electronic apparatus according to claim 1, wherein the detecting unit comprises a reading unit that reads the identification information stored in an RFID tag provided on the consumable entity, and wherein the identification information is read by the reading unit when the consumable entity is attached in the body while the RFID tag is left contactless with respect to the body.

6. The electronic apparatus according to claim 1, wherein the detecting unit comprises a reading unit that reads the identification information contained in a barcode marked on the consumable entity, and wherein the identification information is read by the reading unit when the consumable entity is attached in the body while the barcode is left contactless with respect to the body.

7. The electronic apparatus according to claim 1, wherein the identification information is stored in a storage unit that is built in the consumable entity, and wherein the identification information is read when the consumable entity is attached in the body, with the storage unit connected to a control unit of the body.

8. The electronic apparatus according to claim 1, wherein the electronic apparatus runs on a battery, and wherein the consumable entity is the battery that is replaceable in the body and used as a driving power source of the electronic apparatus.

9. The electronic apparatus according to claim 1, wherein the electronic apparatus is a recording apparatus including the printer, and which requires replenishment of the consumable entity, with which the apparatus performs recording, according to consumption of the consumable entity.

10. The electronic apparatus according to claim 9, wherein the consumable entity is a toner cartridge filled with toner used for recording performed by the electronic apparatus.

11. The electronic apparatus according to claim 9, wherein the consumable entity is an ink ribbon cartridge containing an ink ribbon used for recording by the electronic apparatus.

12. The electronic apparatus according to claim 9, wherein the consumable entity is an ink cartridge filled with ink used for recording by the electronic apparatus.

13. The electronic apparatus according to claim 1, wherein the electronic apparatus is a recording apparatus including the printer, and which requires replacement of the consumable entity, with which the apparatus performs recording, according to wastage of the consumable entity.

14. The electronic apparatus according to claim 9, wherein the consumable entity is a drum set, in which a photoconductive drum used for recording performed by the electronic apparatus is contained.

15. The electronic apparatus according to claim 1, wherein the electronic apparatus is connected via a line to a superordinate apparatus that performs a summing process, and wherein the electronic apparatus sends the evaluation result obtained by the evaluating unit to the superordinate apparatus.

16. The electronic apparatus according to claim 1, wherein the electronic apparatus is connected via Internet line to a remote management center facility that performs a process of summing eco achievement of a plurality of electronic apparatuses, and wherein the electronic apparatus sends the evaluation result obtained by the evaluating unit to the management center.

17. An electronic apparatus that operates with a replaceable consumable entity attached in a body of the electronic apparatus, comprising:

a consumable entity attachment supporting unit that supports the consumable entity in the body in an attachable and detachable manner, wherein the consumable entity is either a consumable entity to which a right to emit greenhouse gas (GHG) has been accorded or a conventional consumable entity to which the right to emit GHG has not been accorded;

a detecting unit that is configured to detect, from the consumable entity supported in the body by the consumable entity attachment supporting unit, identification information indicating whether the GHG emission right has been accorded to the consumable entity;

a global environment enhancing feature for leading to reduction of GHG emissions in global environment;

a goal setting unit for setting a goal for reduction of GHG emissions;

an evaluating unit that evaluates a use status of the global environment enhancing feature, when the identification information is detected by the detecting unit;

a displaying unit that displays an evaluation result obtained by the evaluating unit; and a printer capable of printing the evaluation result on a recording medium;

wherein the right to emit GHG accorded to the consumable entity supported by the consumable entity attachment supporting unit is provided to a purchaser of the consumable entity by a manufacturer/distributor of the consumable entity as CER (Certified Emission Reduction) that corresponds to amounts of GHG generated when power, which is to be consumed during a time period in which the electronic apparatus using the consumable entity is operated, is generated.

18. The electronic apparatus according to claim 17, wherein the global environment enhancing feature includes a batch printing feature (PJ printing), and the goal setting unit sets a power saving level of the electronic apparatus by designating a degree of the batch printing feature.

19. The electronic apparatus according to claim 17, wherein the global environment enhancing feature includes a paper saving feature (N-in-1 printing), and the goal setting unit sets a paper consumption saving level of the electronic apparatus by designating a degree of the paper saving feature.

20. The electronic apparatus according to claim 17, wherein the global environment enhancing feature includes a toner saving feature, and the goal setting unit sets a toner consumption saving level of the electronic apparatus by designating a degree of the toner saving feature.

21. The electronic apparatus according to claim 17, further comprising a power saving button on an operation panel, wherein plural kinds of saving levels, which are set by the goal setting unit, are simultaneously set to predetermined conditions in response to an operation of the power saving button.

22. The electronic apparatus according to claim 17, wherein the evaluating unit evaluates a status of accomplishment of the goal set by the goal setting unit, and wherein the electronic apparatus further includes a navigation unit that gives a user guidance about a manner to use the apparatus for accomplishing the goal set beforehand.

23. An electronic apparatus that operates with a replaceable replacement part attached in a body of the electronic apparatus, comprising:

a replacement part attachment supporting unit that supports the replacement part to the body in an attachable and detachable manner, wherein the replacement part is either a replacement part to which a right to emit greenhouse gas (GHG) has been accorded or a conventional replacement part to which the right to emit GHG has not been accorded;

a detecting unit that is configured to detect, from the replacement part supported in the body by the replacement part attachment supporting unit, identification information indicating whether the right to emit GHG has been accorded to the replacement part;

a memory unit that stores an updatable use status corresponding to at least one replacement part to which the right to emit GHG has been accorded;

an evaluating unit that evaluates a degree of contribution by the electronic apparatus to an activity for reducing GHG, based on the use status stored in the memory unit;

a displaying unit that displays an evaluation result obtained by the evaluating unit; and a printer capable of printing the evaluation result on a recording medium;

wherein the right to emit GHG accorded to the replacement part supported by the replacement part attachment supporting unit is provided to a purchaser of the replacement part by a manufacturer/distributor of the replacement part as CER (Certified Emission Reduction) that corresponds to amounts of GHG generated when power, which is to be consumed during a time period in which the electronic apparatus using the replacement part is operated, is generated.

24. A replacement part that is replaceably provided in a body of an apparatus, wherein when the replacement part completes a life span thereof by being used by the apparatus for a preset period of time while being set inside the body, the replacement part is replaceable with a new replacement part, thereby keeping the apparatus functioning, wherein the replacement part is either a replacement part to which a right to emit greenhouse gas (GHG) has been accorded or a conventional replacement part to which the right to emit GHG has not been accorded, wherein the replacement part is affixed with identification information indicating whether the right to emit GHG has been accorded to the replacement part, the identification information being detectable by a detecting unit included in the apparatus when the replacement part is attached in the body, wherein a degree of contribution to an activity for reducing GHG is evaluated in the apparatus in response to detection of the identification information; and wherein the right to emit GHG accorded to the replacement part provided inside the body is provided to a purchaser of the replacement part by a manufacturer/distributor of the replacement part as CER (Certified Emission Reduction) that corresponds to amounts of GHG generated when power, which is to be consumed during a time period in which the apparatus using the replacement part is operated, is generated.

25. A consumable entity that is replaceably provided in a body of an apparatus, wherein the consumable entity, which is set inside the body, is an entity that is consumed by the apparatus, wherein the consumable entity is either a consumable entity to which a right to emit greenhouse gas (GHG) has been accorded or a conventional consumable entity to which the right to emit GHG has not been accorded, wherein the consumable entity is affixed with identification information indicating whether the GHG emission right has been accorded to the consumable entity, the identification information being readable by a reading unit included in the apparatus when the consumable entity is attached in the body, and wherein the right to emit GHG accorded to the consumable entity replaceably provided in the body of the apparatus is provided to a purchaser of the consumable entity by a manufacturer/distributor of the consumable entity as CER (Certified Emission Reduction) that corresponds to amounts of GHG generated when power, which is to be consumed during a time period in which the apparatus using the consumable entity is operated, is generated.

* * * * *